(12) United States Patent
Chen et al.

(10) Patent No.: US 11,060,903 B2
(45) Date of Patent: Jul. 13, 2021

(54) CAMERA MODULE OF CAMERA

(71) Applicant: TRIPLE WIN TECHNOLOGY (SHENZHEN) CO. LTD., Shenzhen (CN)

(72) Inventors: Shin-Wen Chen, New Taipei (TW); Jian-Chao Song, Guangdong (CN); Sheng-Jie Ding, Guangdong (CN); Jing-Wei Li, Guangdong (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 133 days.

(21) Appl. No.: 16/255,345

(22) Filed: Jan. 23, 2019

(65) Prior Publication Data

US 2020/0200594 A1     Jun. 25, 2020

(30) Foreign Application Priority Data

Dec. 21, 2018    (CN) .......................... 201822166349.9

(51) Int. Cl.
| | |
|---|---|
| *H04N 5/225* | (2006.01) |
| *G01J 1/02* | (2006.01) |
| *G03B 13/36* | (2021.01) |
| *G01J 1/44* | (2006.01) |
| *G01J 1/04* | (2006.01) |

(52) U.S. Cl.
CPC ........... *G01J 1/0204* (2013.01); *G01J 1/0411* (2013.01); *G01J 1/44* (2013.01); *G03B 13/36* (2013.01); *H04N 5/2253* (2013.01); *H04N 5/2254* (2013.01); *H04N 5/22521* (2018.08)

(58) Field of Classification Search
CPC .. H04N 5/2252; H04N 5/2253; H04N 5/2254; H04N 5/2257
See application file for complete search history.

(56) References Cited

U.S. PATENT DOCUMENTS

| | | | |
|---|---|---|---|
| 2008/0099866 A1* | 5/2008 | Chang | H04N 5/2257 |
| | | | 257/433 |
| 2014/0063821 A1* | 3/2014 | Hegde | H05K 3/323 |
| | | | 362/382 |
| 2017/0264799 A1* | 9/2017 | Wang | H01L 27/14634 |
| 2018/0241917 A1* | 8/2018 | Zhang | H04N 5/2252 |
| 2019/0148429 A1* | 5/2019 | Wang | H01L 23/10 |
| | | | 348/294 |

* cited by examiner

*Primary Examiner* — Thanh Luu
(74) *Attorney, Agent, or Firm* — ScienBiziP, P.C.

(57) ABSTRACT

A camera module includes a base, a circuit board bearing the base, and a metal plate bearing the circuit board and the base. The base includes a receiving portion and a bearing portion. The bearing portion surrounds the receiving portion. The bearing portion defines a cutout to receive an electronic component of the circuit board.

16 Claims, 6 Drawing Sheets

CAMERA MODULE OF CAMERA

FIELD

The subject matter herein generally relates to camera modules of a camera.

BACKGROUND

With mobile phones having full-sized screens becoming more prevalent, side, upper, and lower borders of the mobile phone become smaller or the mobile phones may become borderless. Mobile phones with very minimal borders put higher requirements on miniaturization of a camera module of the mobile phone. Generally, the camera module includes a circuit board. A front side of the circuit board includes a photosensitive chip, and other electronic components are arranged around the photosensitive chip, which increases a planar area of the camera module.

Furthermore, mobile phones with very thin borders increase requirements for reliability of the camera module, such as prevention of light leakage, external particles entering the camera module, and electromagnetic interference.

BRIEF DESCRIPTION OF THE DRAWINGS

Implementations of the present disclosure will now be described, by way of embodiments, with reference to the attached figures.

DETAILED DESCRIPTION

Figure 1:
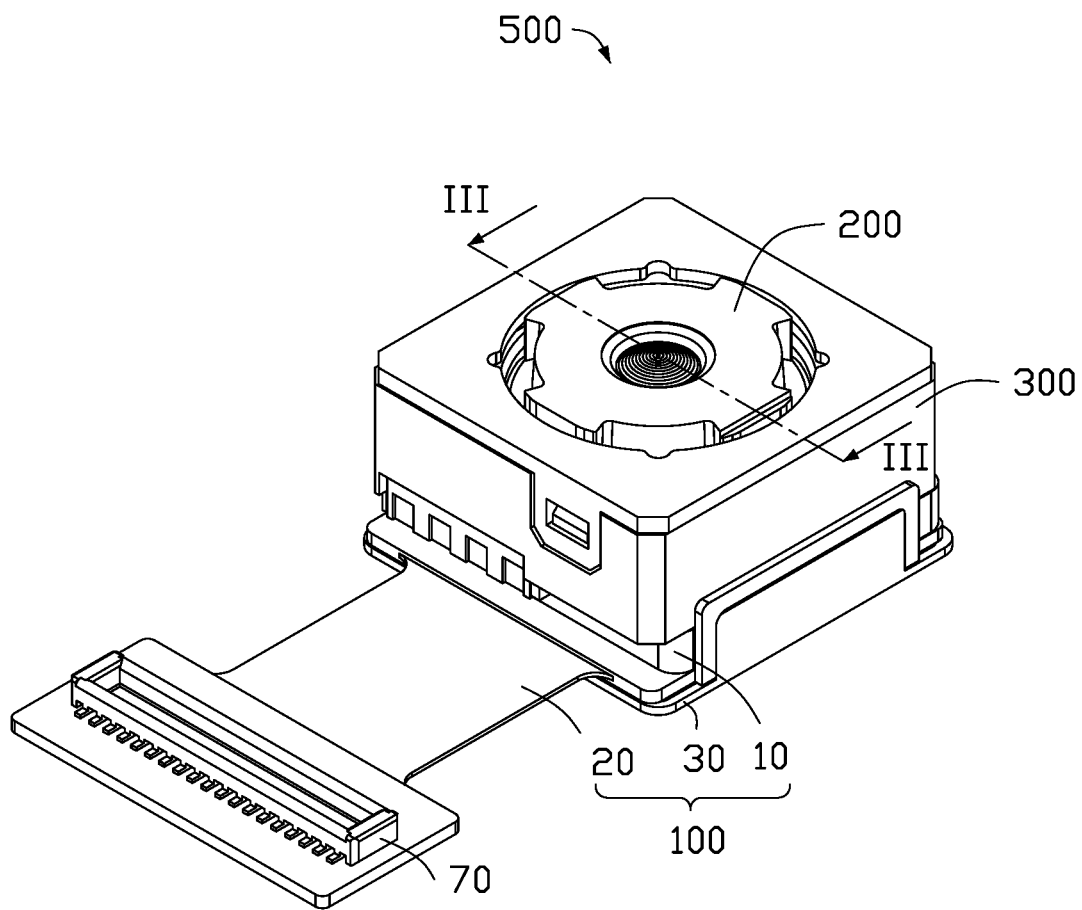
FIG. 1 is an isometric view of an autofocus camera including a camera module.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 2:
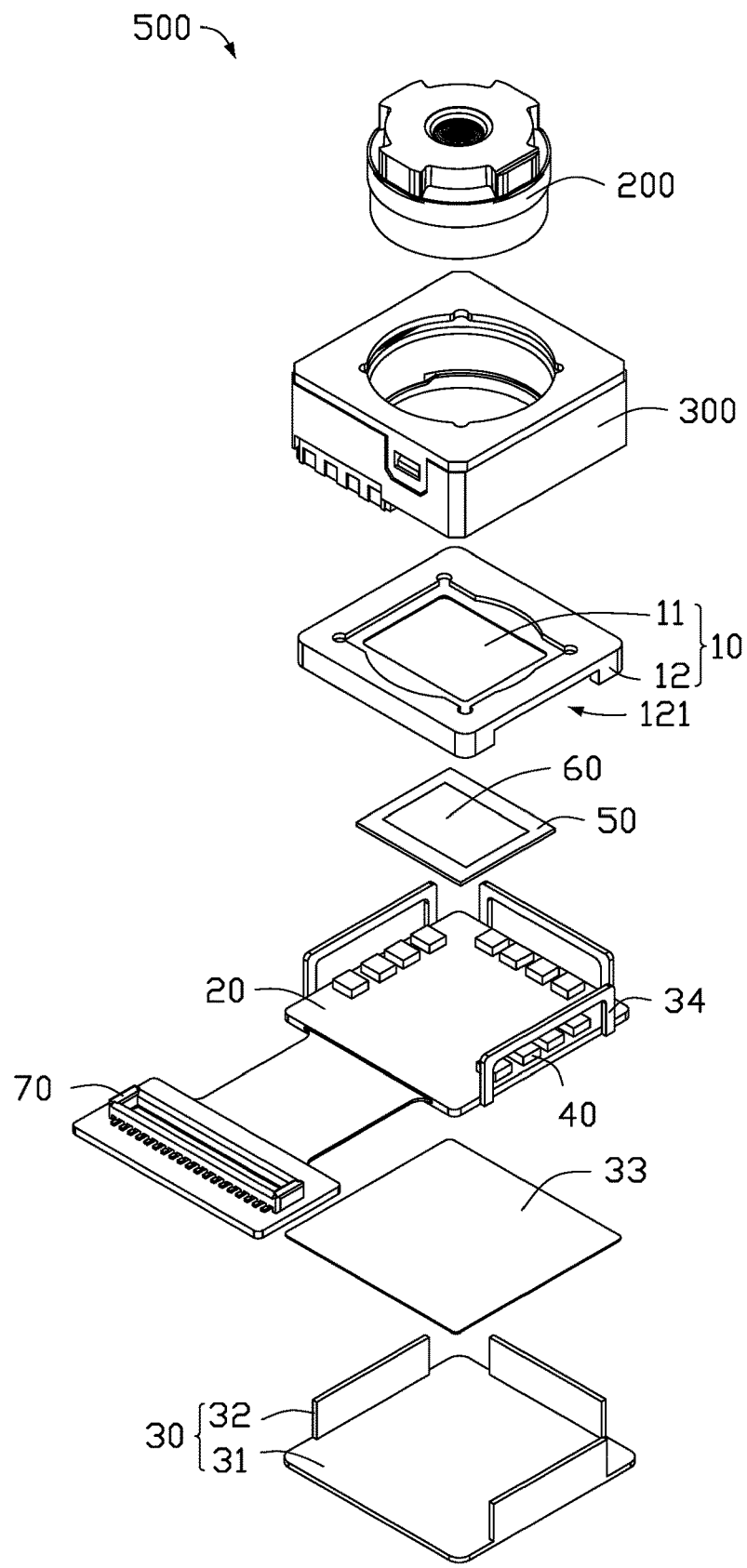
FIG. 2 is an exploded view of the autofocus camera in FIG. 1.
Figure 3:
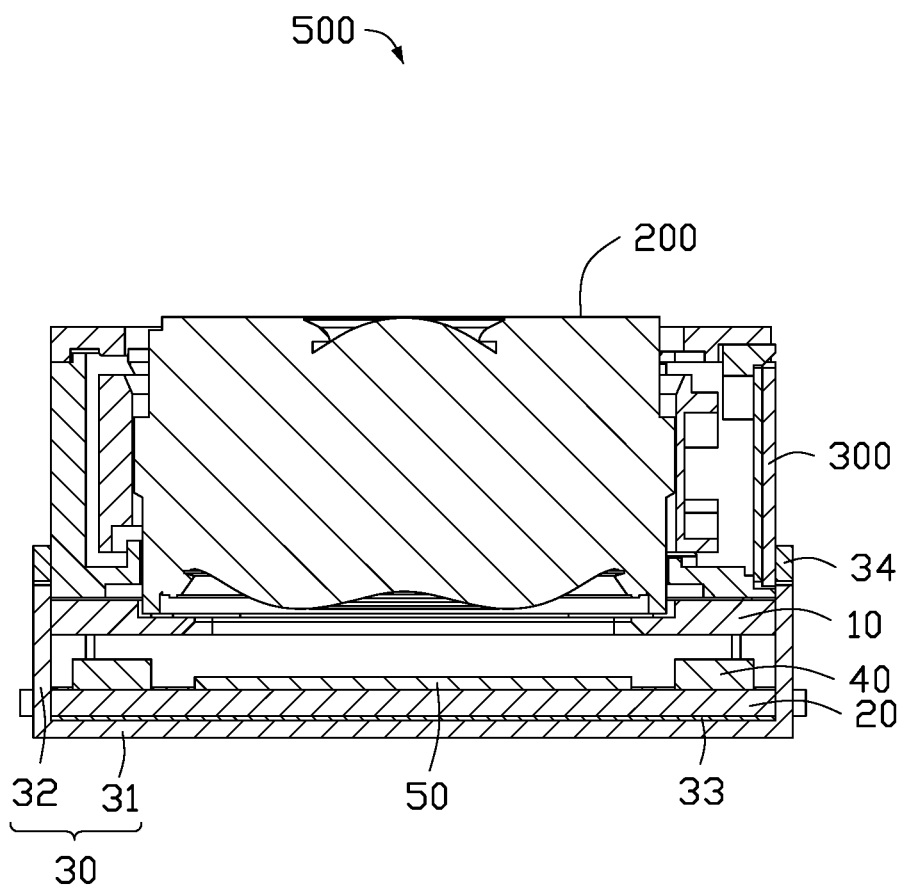
FIG. 3 is a cross-sectional view of the autofocus camera taken along line III-III in FIG. 1.

FIGS. 1-3 show an embodiment of an autofocus camera 500 including a camera module 100.

The camera module 100 includes a base 10, a circuit board 20 bearing the base 10, and a metal plate 30 supporting the circuit board 20 and the base 10. The base 10 includes a receiving portion 11 and a bearing portion 12. The bearing portion 12 surrounds the receiving portion 11. The bearing portion 12 defines a cutout 121 for receiving an electronic component 40 of the circuit board 20.

In one embodiment, the circuit board 20 includes a plurality of electronic components 40, a photosensitive chip 50, and a connector 70. A glass 60 is arranged on the photosensitive chip 50.

The electronic components 40 are arranged within the cutout 121 of the bearing portion 12 and spaced apart from the bearing portion 12 and the photosensitive chip 50. The photosensitive chip 50 and the glass 60 are received in the receiving portion 11, and the connector 70 is located on the circuit board 20 outside of the base 10.

As shown in FIG. 2, the receiving portion 11 is a through hole passing through the base 10. An upper surface of the base 10 is a flat surface for bearing a voice coil motor 300. The voice coil motor 300 receives the lens 200.

In one embodiment, the bearing portion 12 includes four sidewalls. The sidewall adjacent to the connector 70 on the circuit board 20 is solid, and the other three sidewalls of the bearing portion 12 define the cutout 121.

In one embodiment, the metal plate 30 includes a base panel 31 and three side panels 32. The three side panels 32 are coupled substantially perpendicularly to the base panel 31. The base panel 31 bears the circuit board 20. The side panels 32 are fitted to the cutout 121. The side panels 32 are not connected with each other.

In one embodiment, a conductive heat dissipating adhesive 33 is coated between the base panel 31 of the metal plate 30 and the circuit board 20.

In one embodiment, a glue 34 is applied at a junction of the side panels 32 of the metal plate 30, a side of the circuit board 20, and the bearing portion 12.

In a first step of assembly, the electronic components 40, the photosensitive chip 50, and the connector 70 are fixed to the circuit board 20 at a designated position, and the glass 60 is placed on the photosensitive chip 50.

In a second step of assembly, a layer of conductive heat dissipating adhesive 33 is applied on the base panel 31 of the metal plate 30 and the circuit board 20, and the circuit board 20 is placed on the base panel 31.

In a third step of assembly, the base 10 is placed on the circuit board 20, such that the receiving portion 11 of the base 10 receives the photosensitive chip 50 and the glass 60. The sidewalls of the bearing portion 12 are coupled to the side panels 32 of the metal plate 30, and the cutout 121 of the bearing portion 12 receives the electronic components 40.

In a fourth step of assembly, the glue 34 is applied to the junction of an outer side of the side panels 32 of the metal plate 30, the side of the circuit board 20, and the bearing portion 12 of the base 10.

After the camera module 100 is installed, the voice coil motor 300 of the lens 200 is fixed on the base 10, and then a protective film (not shown) is mounted on the lens 200 to complete installation of the autofocus camera 500.

By providing the cutout 121 on the bearing portion 12 of the base 10, the electronic components 40 are received within the cutout 121, thereby reducing a size of the camera module 100.

Grounding and heat dissipation is achieved by applying the conductive heat dissipating adhesive 33 between the base panel 31 of the metal plate 30 and the circuit board 20.

By applying the glue 34 to the outer side of the side panels 32 of the metal plate 30, the side of the circuit board 20, and the bearing portion 12 of the base 10, light leakage of the camera module 100 is prevented, external particles are prevented from entering the camera module 100, and electromagnetic interference is prevented.

Figure 4:
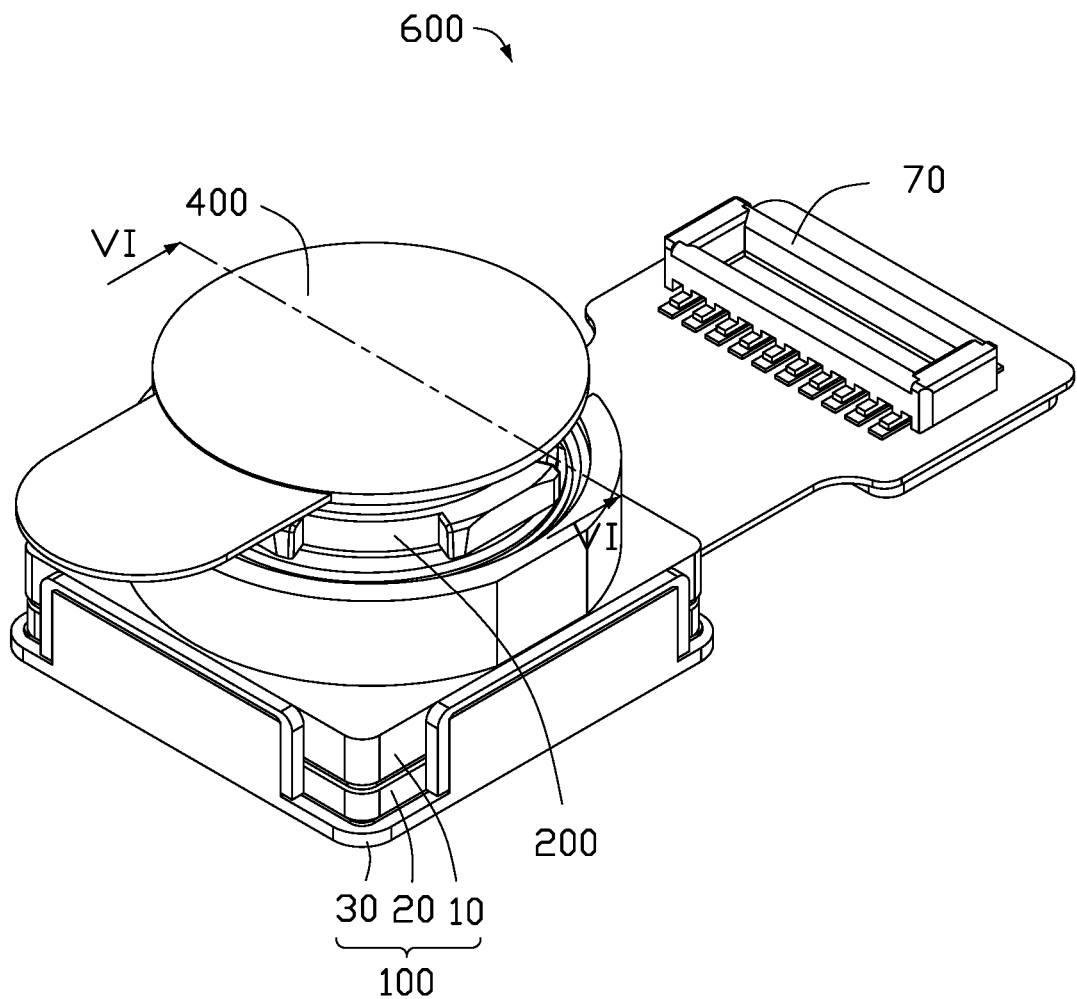
FIG. 4 is an isometric view of a fixed focus camera including a camera module.
Figure 5:
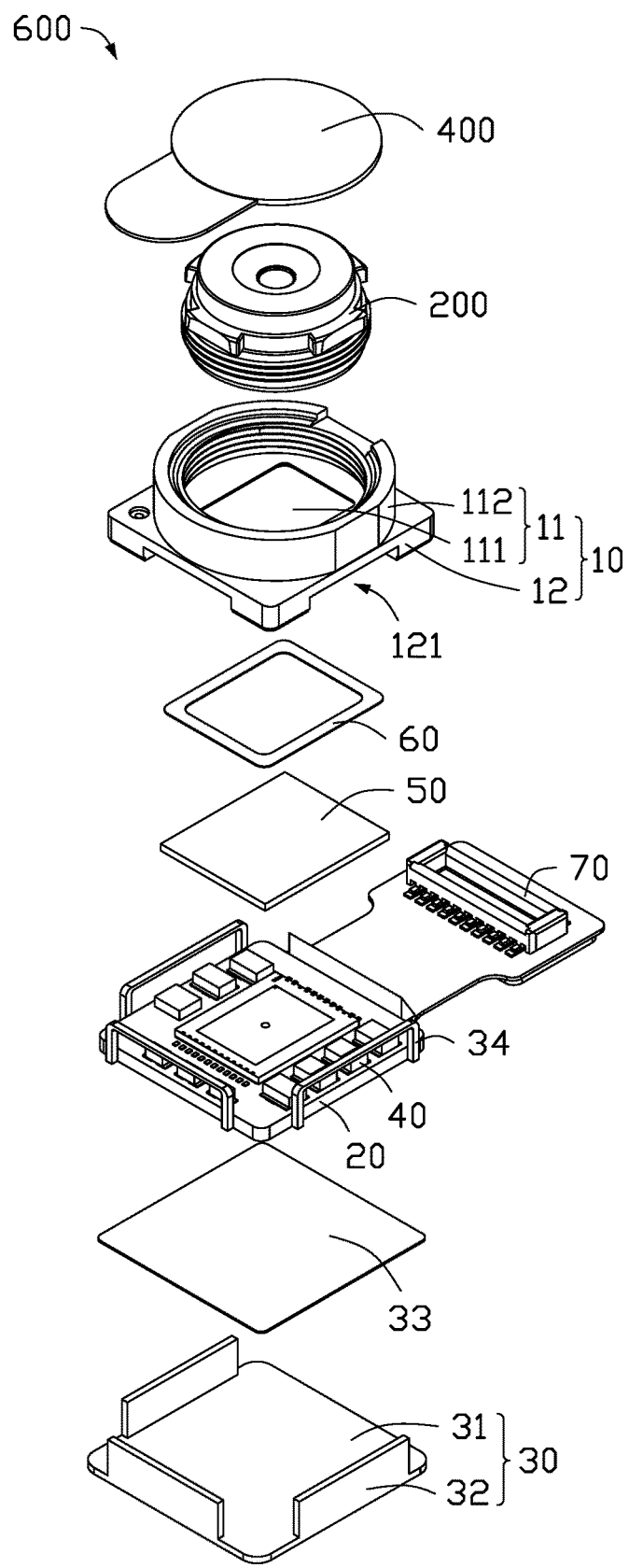
FIG. 5 is an exploded view of the fixed focus camera in FIG. 4.
Figure 6:
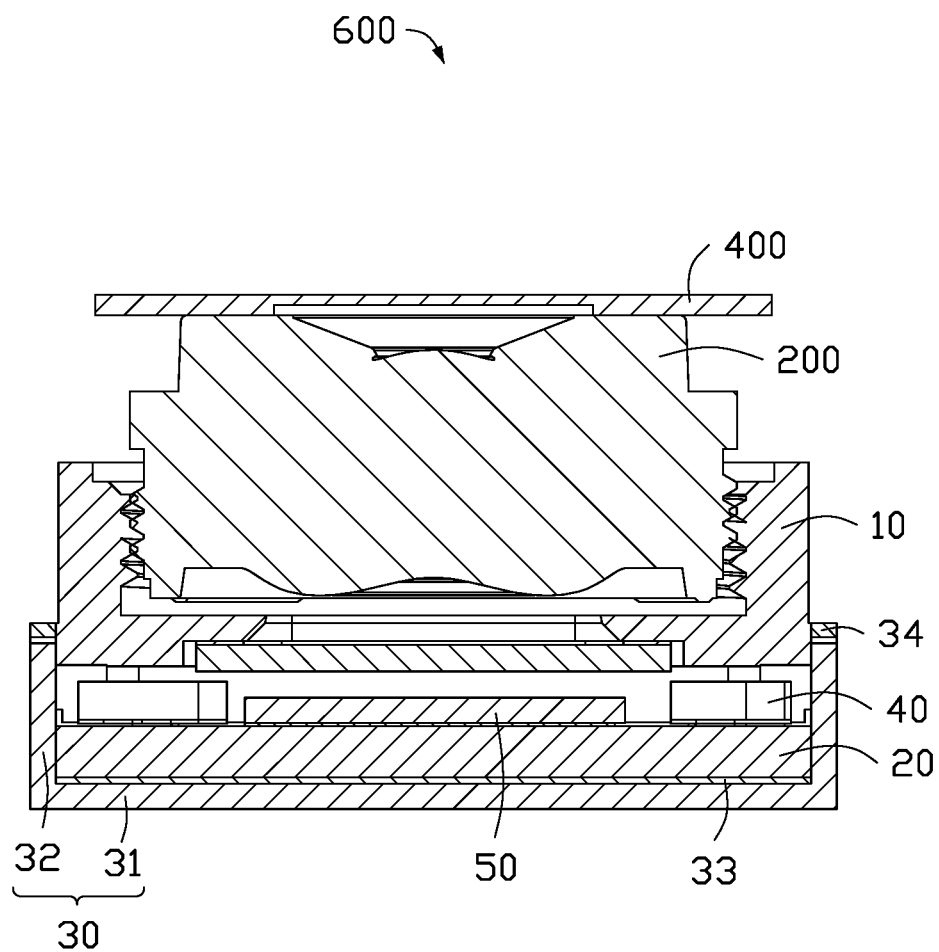
FIG. 6 is a cross-sectional view of the fixed focus camera taken along line VI-VI of FIG. 4.

FIGS. 4-6 show an embodiment of a fixed focus camera 600.

A difference between the fixed focus camera 600 and the autofocus camera 500 is that the receiving portion 11 of the fixed focus camera 600 includes a through hole 111 and a hollow cylindrical structure 112. The through hole 111 is defined in the base 10, and the hollow cylindrical structure 112 extends from a surface of the bearing portion 12 and communicates with the through hole 111. The hollow cylindrical structure 112 receives the lens 200, and the through hole 111 receives the photosensitive chip 50 and the glass 60 on the circuit board 20.

After the camera module 100 is installed, the lens 200 is received in the hollow cylindrical structure 112 of the receiving portion 11 of the base 10, and then a protective film 400 is mounted on the lens 200 to complete assembly of the fixed focus camera 600.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A camera module comprising:
a base;
a circuit board bearing the base; and
a metal plate bearing the circuit board and the base; wherein:
the base comprises a receiving portion and a bearing portion;
the bearing portion surrounds the receiving portion;
the bearing portion defines at least one cutout to receive at least one electronic component of the circuit board;
the circuit board comprises a plurality of electronic components, a connector, and a photosensitive chip, the plurality of electronic components are arranged within the cutout of the bearing portion and spaced apart from the bearing portion and the photosensitive chip, the photosensitive chip is received within the receiving portion, a glass is arranged on the photosensitive chip.

2. The camera module of claim 1, wherein:
the connector is on the circuit board and outside of the base.

3. The camera module of claim 1, wherein:
the receiving portion is a through hole;
an upper surface of the base is a flat surface and configured for bearing a voice coil motor;
the voice coil motor is configured to receive a lens.

4. The camera module of claim 1, wherein:
the receiving portion comprises a through hole and a hollow cylindrical structure;
the hollow cylindrical structure receives the lens;
the through hole receives the photosensitive chip and the glass.

5. The camera module of claim 1, wherein:
the bearing portion comprises four sidewalls;
the sidewall adjacent to the connector is solid;
the other three sidewalls define the at least one cutout.

6. The camera module of claim 1, wherein:
the metal plate comprises a base panel and three side panels extending from the base panel;
the base panel bears the circuit board;
the side panels are fitted with the cutout of the bearing portion;
the three side panels are not connected with each other.

7. The camera module of claim 6, wherein the metal plate comprises a conductive heat dissipating adhesive coated between the base panel and the circuit board.

8. The camera module of claim 6, wherein a glue is applied at a junction of the side panels of the metal plate, a side of the circuit board, and the bearing portion.

9. A camera module comprising:
a base;
a circuit board bearing the base;
a metal plate bearing the circuit board and the base; wherein:
the base comprises a receiving portion and a bearing portion;
the bearing portion surrounds the receiving portion;
the bearing portion defines at least one cutout to receive at least one electronic component of the circuit board;
the circuit board comprises a plurality of electronic components, a connector, and a photosensitive chip, the plurality of electronic components are arranged within the cutout of the bearing portion and spaced apart from the bearing portion and the photosensitive chip, the photosensitive chip is received within the receiving portion, a glass is arranged on the photosensitive chip.

10. The camera of claim 9, wherein:
the connector is on the circuit board and outside of the base.

11. The camera of claim 9, wherein:
the receiving portion is a through hole;
an upper surface of the base is a flat surface and configured for bearing a voice coil motor;
the voice coil motor is configured to receive a lens.

12. The camera of claim 9, wherein:
the receiving portion comprises a through hole and a hollow cylindrical structure;
the hollow cylindrical structure is configured to receive a lens;
the through hole is configured to receive the photosensitive chip and the glass.

13. The camera of claim 9, wherein:
the bearing portion comprises four sidewalls;
the sidewall adjacent to the connector is solid;
the other three sidewalls define the at least one cutout.

14. The camera of claim 9, wherein:
the metal plate comprises a base panel and three side panels extending from the base panel;
the base panel bears the circuit board;

the side panels are fitted with the at least one cutout of the bearing portion;

the three side panels are not connected to each other.

15. The camera of claim 14, wherein the metal plate comprises a conductive heat dissipating adhesive coated between the base panel and the circuit board.

16. The camera of claim 14, wherein a glue is applied at a junction of the side panels of the metal plate, a side of the circuit board, and the bearing portion.

* * * * *